(12) United States Patent
Laible

(10) Patent No.: US 10,850,458 B1
(45) Date of Patent: Dec. 1, 2020

(54) METHOD OF FORMING A CONTAINER INSERT FOR USE IN A CLOSED LOOP DISPENSING SYSTEM

(71) Applicant: Rodney Laible, Omaha, NE (US)

(72) Inventor: Rodney Laible, Omaha, NE (US)

( * ) Notice: Subject to any disclaimer, the term of this patent is extended or adjusted under 35 U.S.C. 154(b) by 0 days.

(21) Appl. No.: 16/717,016

(22) Filed: Dec. 17, 2019

Related U.S. Application Data

(63) Continuation of application No. 16/395,977, filed on Apr. 26, 2019, now Pat. No. 10,576,702, which is a continuation-in-part of application No. 16/266,744, filed on Feb. 4, 2019, now Pat. No. 10,414,644.

(51) Int. Cl.
  B29C 70/68 (2006.01)
  B67D 7/02 (2010.01)
  B29L 31/56 (2006.01)

(52) U.S. Cl.
  CPC ............ *B29C 70/68* (2013.01); *B67D 7/0294* (2013.01); *B29L 2031/565* (2013.01)

(58) Field of Classification Search
  CPC .. B29C 70/68; B67D 7/0294; B29L 2031/565
  See application file for complete search history.

(56) References Cited

U.S. PATENT DOCUMENTS

| | | | |
|---|---|---|---|
| 5,988,456 A | 11/1999 | Laible | |
| 6,142,345 A | 11/2000 | Laible | |
| 6,669,062 B1 | 12/2003 | Laible | |
| 6,968,983 B2 | 11/2005 | Laible | |
| 9,126,725 B1* | 9/2015 | Laible | B65D 25/50 |
| 9,242,847 B1 | 1/2016 | Laible | |
| 10,414,644 B1 | 9/2019 | Laible | |
| 2006/0210746 A1* | 9/2006 | Shi | B29B 11/08 |
| | | | 428/35.7 |
| 2007/0108668 A1* | 5/2007 | Hutchinson | B29C 33/04 |
| | | | 264/521 |
| 2011/0061795 A1* | 3/2011 | Erni | B29C 45/14221 |
| | | | 156/242 |
| 2014/0190925 A1* | 7/2014 | Ropele | B29C 45/0003 |
| | | | 215/44 |
| 2015/0232319 A1* | 8/2015 | Wedderburn | B65D 61/00 |
| | | | 222/153.14 |
| 2015/0336716 A1* | 11/2015 | Gehringer | B29C 45/1676 |
| | | | 215/316 |
| 2018/0312307 A1* | 11/2018 | Kittmann | B65D 43/0202 |
| 2019/0135500 A1* | 5/2019 | Thometschek | B29C 48/022 |
| 2019/0308778 A1* | 10/2019 | Gift | B29C 45/1676 |
| 2019/0344944 A1* | 11/2019 | Maguire | B65D 41/34 |
| 2020/0062467 A1* | 2/2020 | McPherson | B65D 41/62 |
| 2020/0102130 A1* | 4/2020 | Parekh | B32B 27/08 |

* cited by examiner

*Primary Examiner* — Donnell A Long
(74) *Attorney, Agent, or Firm* — Dennis L. Thomte; Thomte Patent Law Office LLC

(57) ABSTRACT

A container insert is disclosed for use with a closed loop dispensing system. The container insert is press-fitted into the throat of a liquid container. The container insert is comprised of a plastic substrate portion and an over-molded portion. This invention is directed to the method of simultaneously molding the plastic substrate portion and the over-molded portion.

8 Claims, 10 Drawing Sheets

METHOD OF FORMING A CONTAINER INSERT FOR USE IN A CLOSED LOOP DISPENSING SYSTEM

CROSS REFERENCE TO RELATED APPLICATION

This is a Continuation Application of application Ser. No. 16/395,977 filed Apr. 26, 2019, entitled METHOD OF FORMING A CONTAINER INSERT FOR USE IN A CLOSED LOOP DISPENSING SYSTEM, which is a Continuation-In-Part Application of application Ser. No. 16/266,744 filed Feb. 5, 2019 (U.S. Pat. No. 10,414,644 B1 issued Sep. 17, 2019), entitled CONTAINER INSERT FOR USE IN A CLOSED LOOP DISPENSING SYSTEM.

BACKGROUND OF THE INVENTION

Field of the Invention

This invention relates to a container insert for use in a closed loop dispensing system. More particularly, this invention relates to a container insert which is press-fitted into the throat of a liquid container. Even more particularly, this invention relates to a container insert which is completely recyclable. Even more particularly, the container insert of this invention is automatically self-venting, Even more particularly, the container insert of this invention is manufactured by an over-molding process which reduces overall part count and overall assembly time. Even more particularly, this invention includes structure for opening the center chemical flow channel of the container insert. Even more particularly, this invention relates to the method of simultaneously molding the plastic substrate portion and the over-molded portion to form the container insert.

Description of the Related Art

Many container inserts have been provided for insertion into the throat of a container containing liquid chemical. Applicant has previously received U.S. Pat. Nos. 9,242,847; 6,968,983; 6,669,062; 6,142,345 and 5,988,456 wherein inserts have been provided which are inserted into the throat of a liquid container. Applicant's earlier patents represent an advance in closed loop dispensing systems. However, the container inserts of Applicant's earlier patents involve considerable parts requiring some assembly time. Further, the containers of Applicant's earlier patents require a mechanical interaction between the container insert and the dispensing cap to open the chemical valve in the container insert to enable the liquid chemical in the container to be dispensed to a mixing machine, etc. The instant invention is directed to the method of simultaneously molding the plastic substrate portion and the over-molded portion of the container insert.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

A container insert is disclosed for use with a closed loop dispensing system including a container having a throat with an inside surface. The insert includes a substrate portion having an over-molded portion thereon. The substrate portion includes a horizontally disposed ring-shaped lip having an upper side, a lower side, an outer end and an inner end. The substrate also has a generally cylindrical upper wall member having an open upper end, an open lower end, an inner side and an outer side. The upper wall member of the substrate extends downwardly from the inner end of the lip whereby the lip protrudes outwardly from the upper end of the upper wall member. The substrate portion includes a horizontally disposed and generally disc-shaped wall at the lower end of the upper wall member, and which has an inner end, an outer end, an upper side and a lower side. The substrate also includes a generally cylindrical lower wall member, having an open upper end and an open lower end, an inner side and an outer side, with the lower wall member extending downwardly from the outer end of the disc-shaped wall whereby the lower end of the upper wall member is positioned outwardly of the upper end of the lower wall member. The substrate also includes a vertically disposed and cylindrical hollow tube, having an open upper end and an open lower end, which is positioned at the center of the disc-shaped wall. The open upper end of the hollow tube is positioned above the disc-shaped wall and the open lower end of the hollow tube is positioned below the disc-shaped wall. The disc-shaped wall has a plurality of radially spaced-apart openings formed therein outwardly of the hollow tube. The lip, upper wall member, the hollow tube and the disc-shaped wall of the substrate are over-molded with a plastic material.

A flexible valve, having an upper side and a lower side, is positioned in the open upper end of the over-molded hollow tube to normally close the open upper end of the over-molded tube. The flexible valve is opened upon the upper side of the flexible valve being subjected to a suction force thereby permitting liquid from the container to pass upwardly therethrough. The disc-shaped wall of the over-molded portion has a plurality of radially spaced-apart openings formed therein which register with the radially spaced-apart openings in the disc-shaped wall of the substrate. The disc-shaped wall of the over-molded portion has a plurality of hollow protrusions which extend downwardly from the openings in the disc-shaped wall thereof with each of the protrusions having an open upper end and open lower end. Each of the protrusions has a bi-directional valve at the lower end thereof. Each of the bi-directional valves are normally closed to prevent liquid from passing upwardly therethrough. Each of the bi-directional valves are movable downwardly to an open position to permit air to pass downwardly therethrough to vent the container. Each of the bi-directional valves are movable upwardly to an open position to permit the gas in the container to be de-gassed upwardly therethrough.

A dip tube is in communication with the lower end of the hollow tube of the container insert and which is in communication with the liquid in the liquid container. A dispenser cap is removably mounted on the throat of the container.

The instant invention relates to the method of forming the container insert wherein the plastic substrate portion and the over-molded portion thereof are simultaneously molded to form the container insert.

It is a principal object of the invention to provide an improved container insert for use in a closed loop dispensing system.

A further object of the invention is to provide a container insert which is completely recyclable.

A further object of the invention is to provide a container insert which reduces the cost of manufacturing the same due to an over-molding process that reduces the overall part count and overall assembly time.

A further object of the invention is to provide a container insert which is automatically self-venting.

A further object of the invention is to provide a container insert which includes a plurality of bi-directional valves for air venting and chemical off-gassing.

A further object of the invention is to provide a container insert which is economical of manufacture and durable in use.

The instant invention is directed to the method of simultaneously molding the plastic substrate portion and the over-molded portion of the insert.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Figure 1:
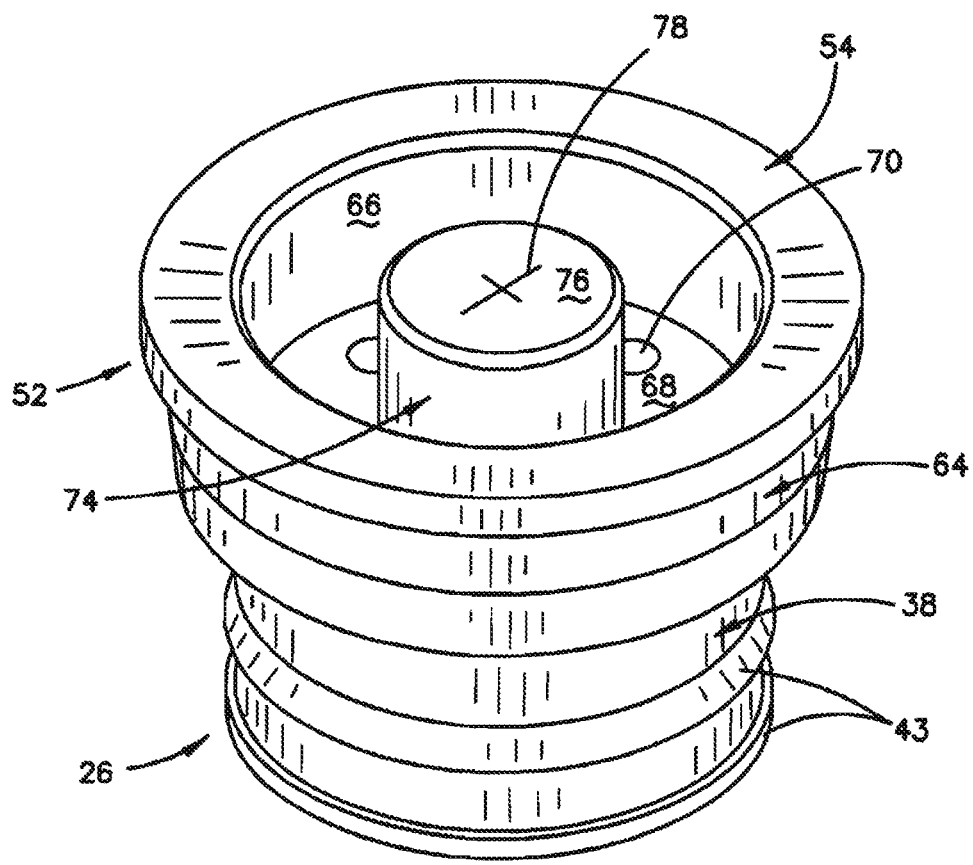
FIG. 1 is a perspective view of the container insert of this invention.
Figure 2:
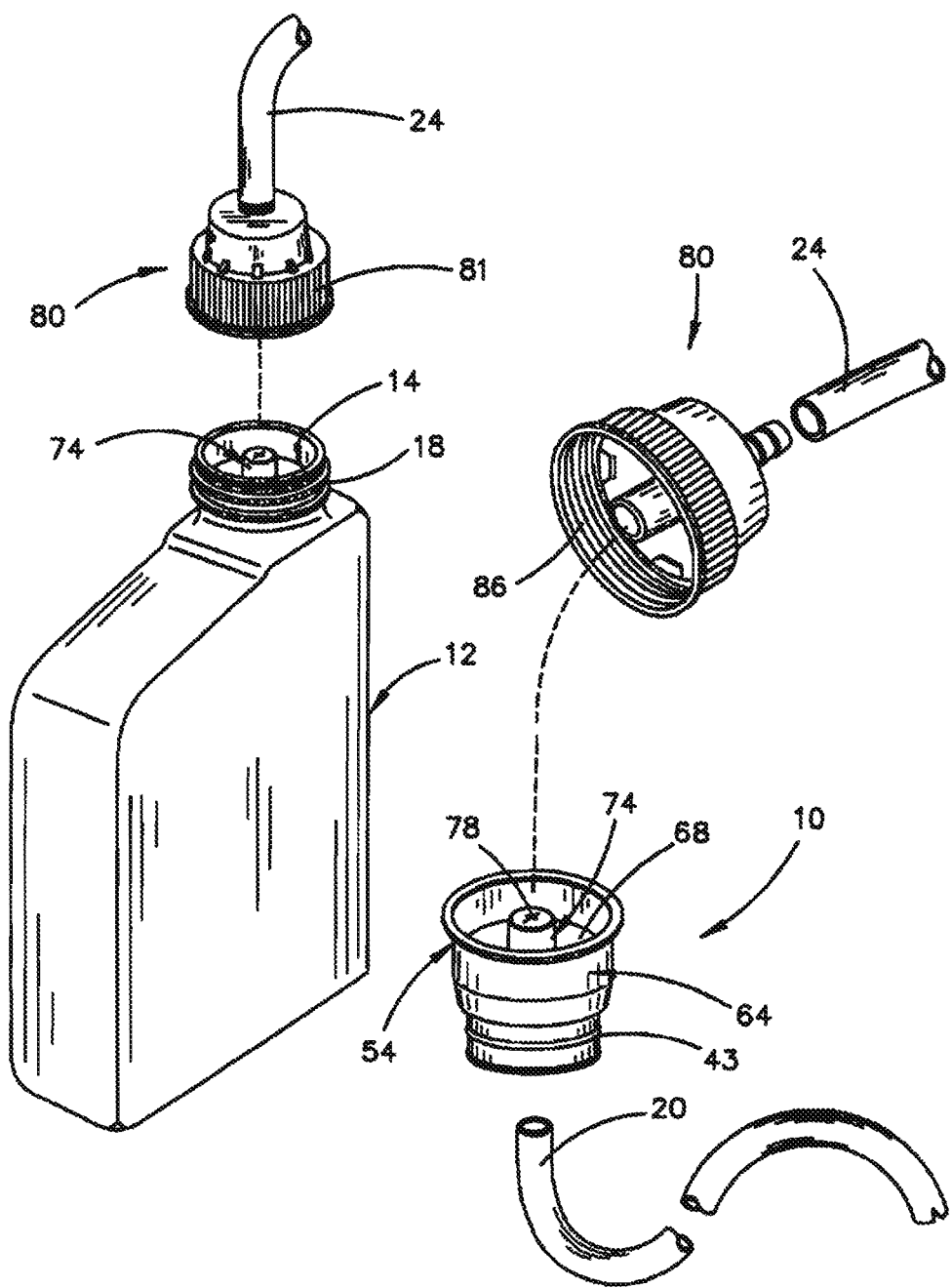
FIG. 2 is a perspective view of a liquid container and an exploded perspective view of the container insert, dispensing cap, etc.
Figure 3:
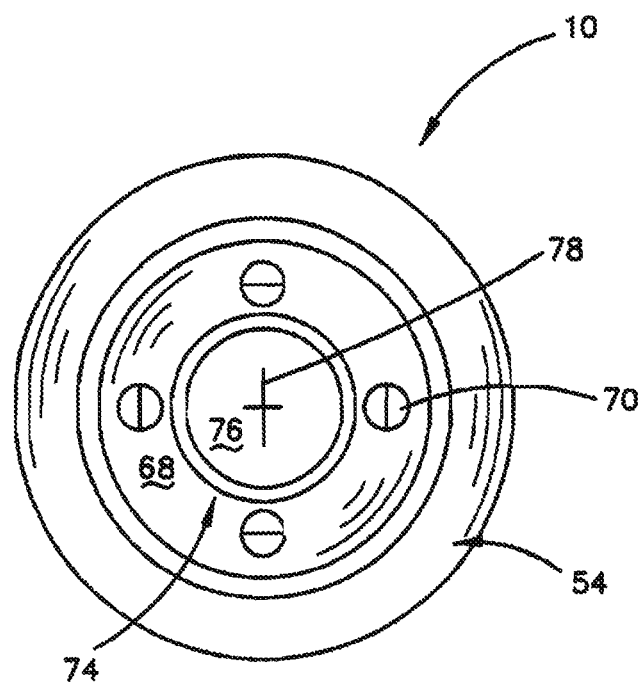
FIG. 3 is a top view of the container insert of this invention.
Figure 4:
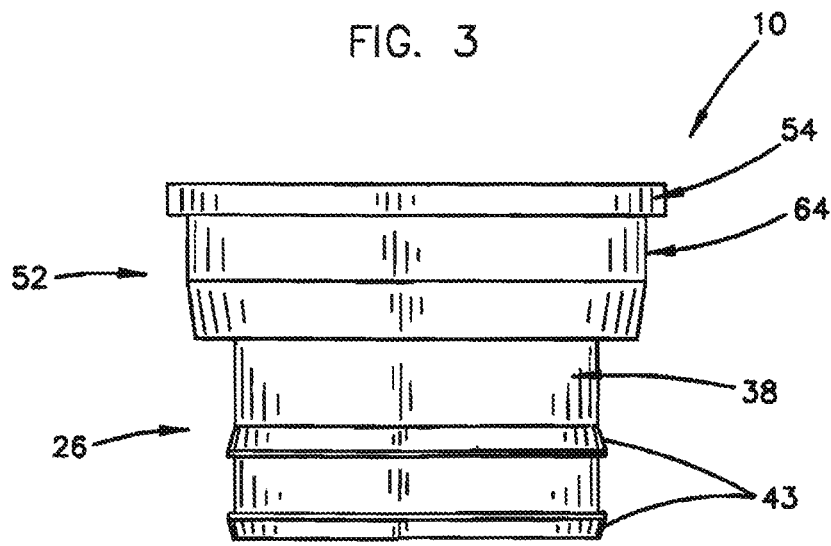
FIG. 4 is a side view of the container insert of this invention.
Figure 5:
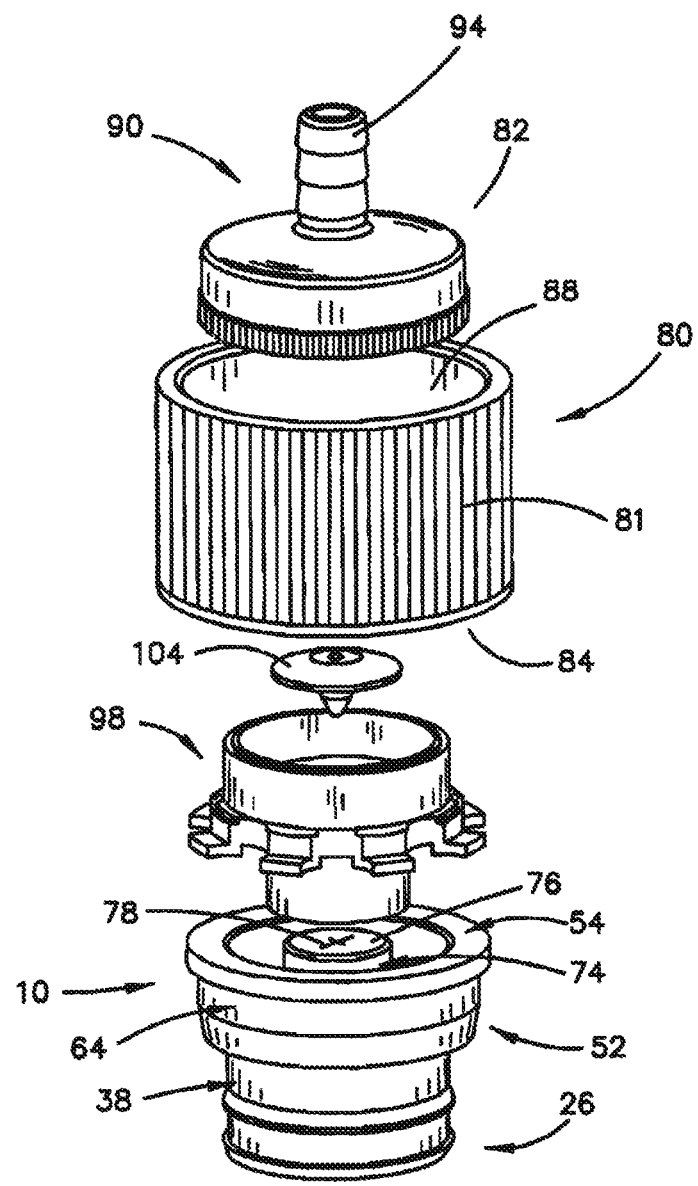
FIG. 5 is an exploded perspective view of the container insert of this invention and associated components.
Figure 6:
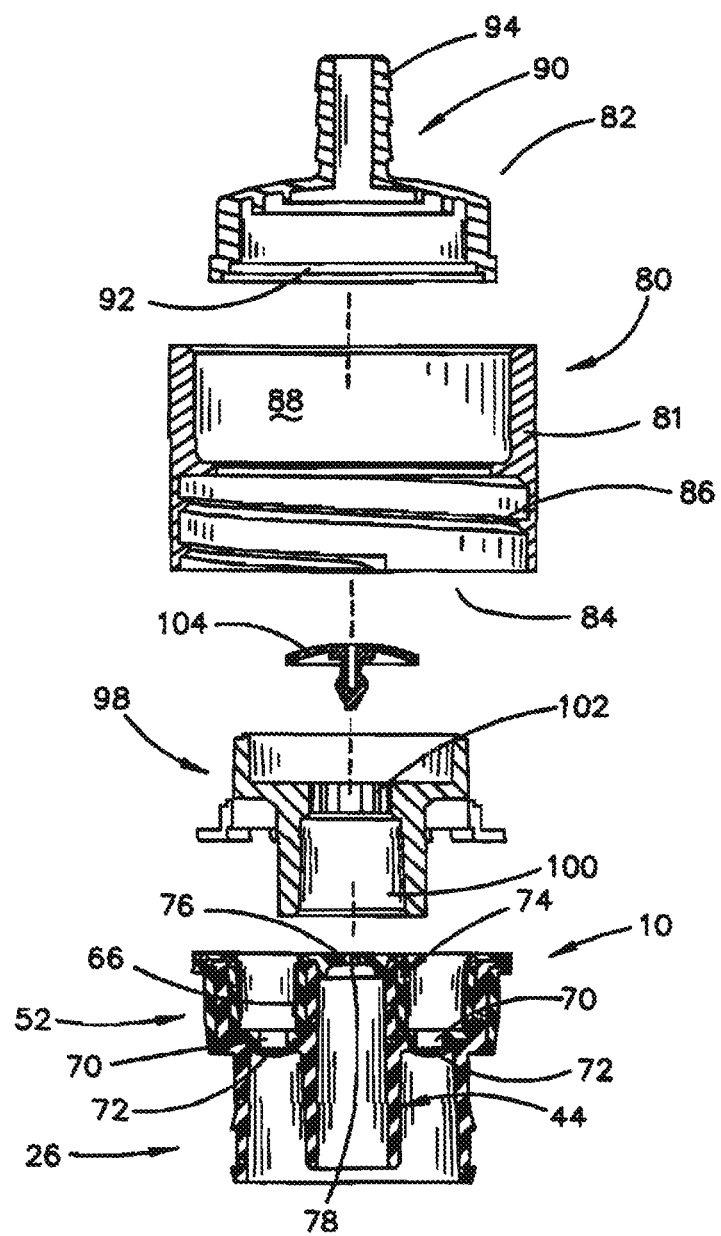
FIG. 6 is an exploded sectional view of the container insert of this invention and associated components.
Figure 7:
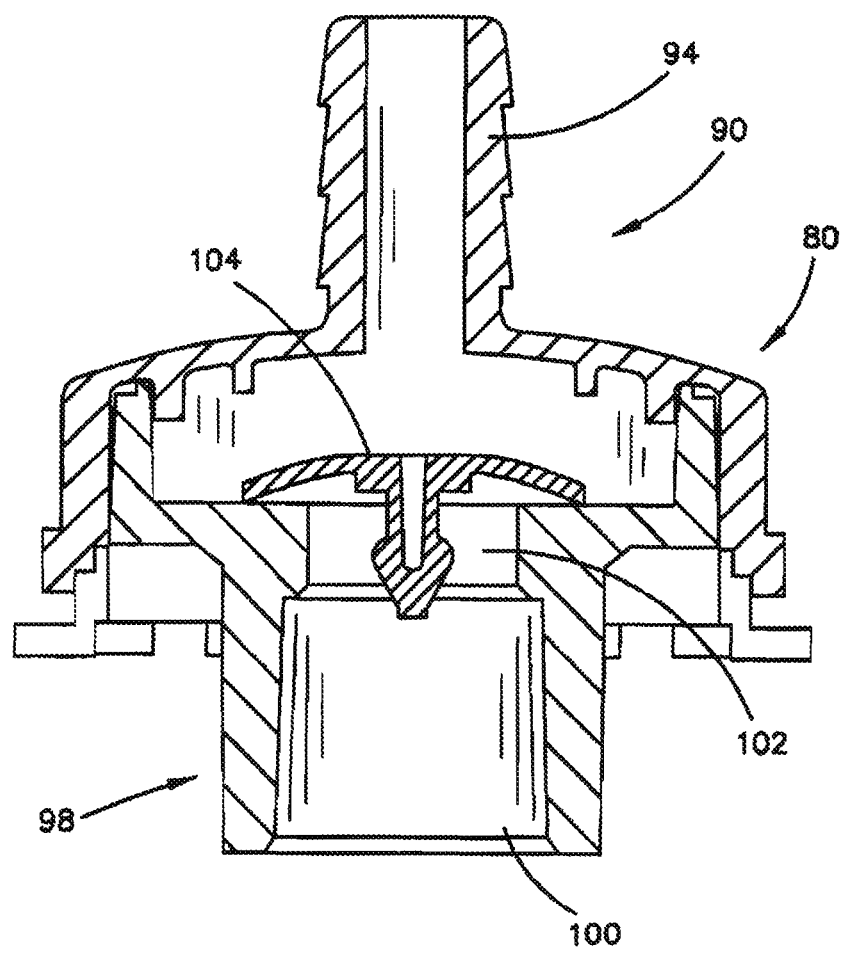
FIG. 7 is a sectional view of the dispensing cap which is utilized with the container insert of this invention.

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

The numeral 10 refers to the container insert of this invention which is used in a closed loop dispensing system. The closed loop dispensing system includes a container 12 having a throat 14 at its upper end and which has an inner surface 16 (not shown) and an externally threaded outer surface 18. As will be explained hereinafter, insert 10 is selectively removably positioned in the throat 14 of the container 12 as described in my earlier patents. A dip tube 20 is secured to the lower end of insert 10 as will be described hereinafter. Dip tube 20 extends downwardly into container 12 in conventional fashion. As will be described hereinafter, a dispenser cap assembly 22 is selectively threadably secured to the externally threaded outer surface 18 of throat 14. As will be described hereinafter, a dispensing tube 24 extends from extends from dispenser cap assembly 22 to a mixing machine, mixer, dispenser, container, etc. as described in my earlier patents.

Insert 10 includes a substrate portion 26 which is comprised of a suitable plastic material. Substrate portion 26 includes a horizontally disposed and ring-shaped lip 28. A generally cylindrical upper wall member 30 extends downwardly from the inner end of lip 28 and has an upper end 32 and a lower end 34. The numeral 36 refers to a horizontally disposed and disc-shaped wall which extends inwardly from the lower end 34 of upper wall member 30. A generally cylindrical and hollow lower wall member 38 extends downwardly from upper wall member 30 inwardly of the lower end 34 of upper wall member 30. Lower wall member 36 will be described as having an upper end 40 and a lower end 42. The outer side of lower wall member 38 has a plurality of ring-shaped gripping members 43 extending therefrom.

Figure 8:
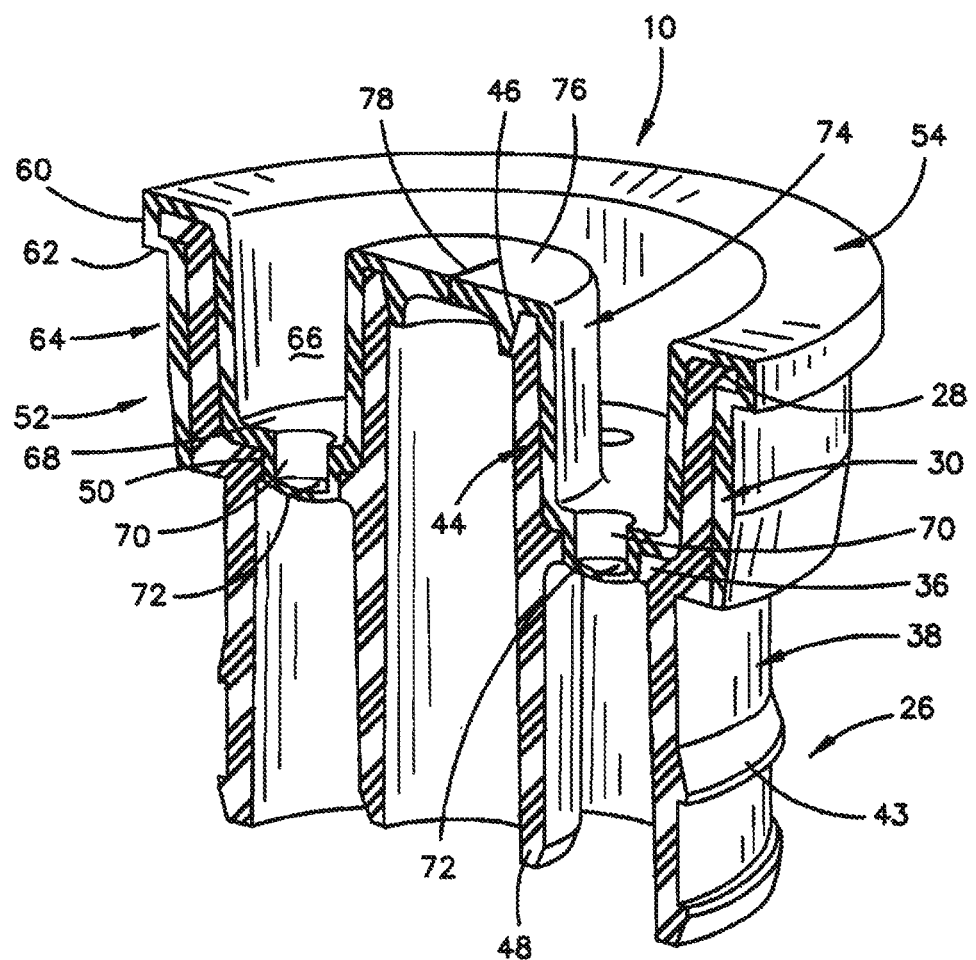
FIG. 8 is a perspective sectional view of the container insert of this invention.
Figure 9:
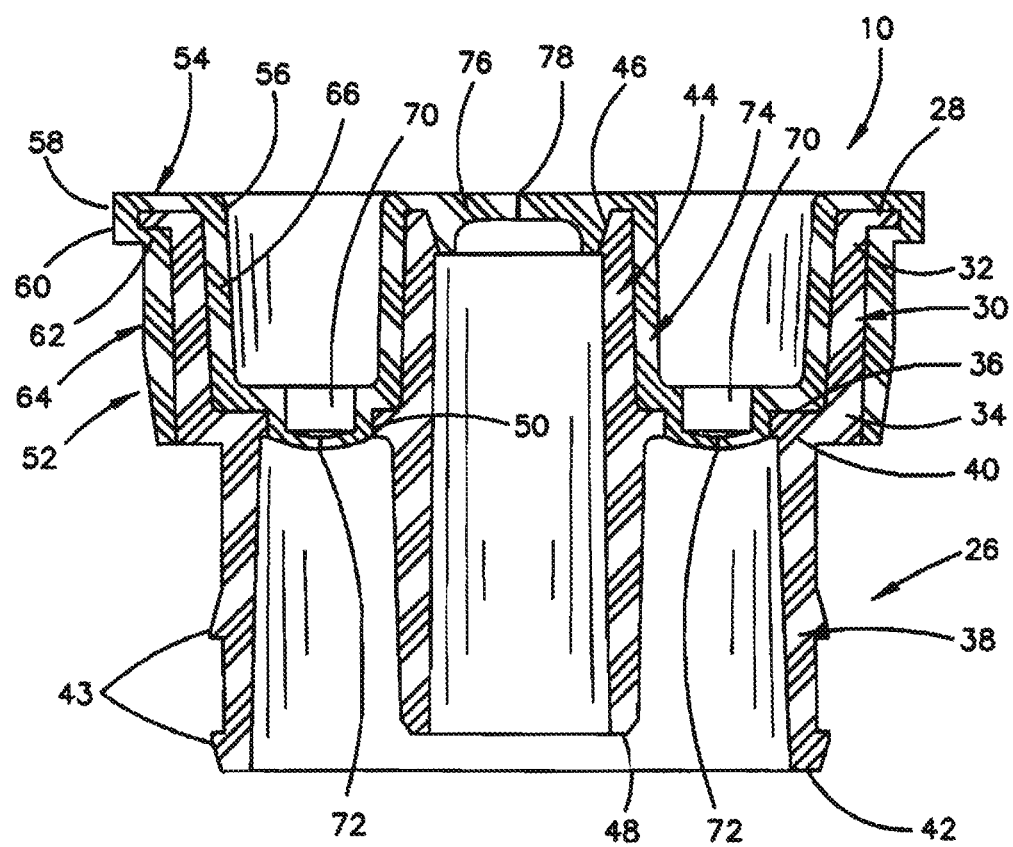
FIG. 9 is a sectional view of the container insert of this invention.

The numeral 44 refers to a vertically disposed tube which is molded with wall 36 at the center thereof with the open upper end 46 of tube 44 being positioned above wall 36 and with the open lower end 48 of tube 44 being positioned below wall 36. Wall 36 is provided with a plurality of radially spaced-apart openings 50 formed therein. Preferably, the upper end 46 of tube 44 is tapered as seen in FIGS. 8 and 9.

The numeral 52 refers to the over-molded portion of the insert 10 which is over-molded onto the substrate portion 26. Over-molded portion 52 includes a horizontally disposed and ring-shaped lip 54 having an inner end 56 and an outer end 58. A vertically disposed and ring-shaped wall 60 extends downwardly from the outer end 58 of lip 54. A short and horizontally disposed wall 62 extends inwardly from the lower end of wall 60. A generally cylindrical and preferably tapered wall 64 extends downwardly from the inner end of wall 62. A generally cylindrical wall 66 extends downwardly from the inner end 56 of lip 54. As seen, lip 28 and wall member 30 of substrate portion 26 are embedded in the over-molded portion 52.

The over-molded portion 52 includes a horizontally disposed and disc-shaped wall 68 which extends inwardly from the lower end of wall 66 and which is positioned on wall 36. Wall 68 has a plurality of radially spaced-apart hollow plastic protrusions 70 formed therewith which extend downwardly from wall 68 into the radially spaced-apart openings 50 formed in wall 36. Protrusions 70 have open upper ends and open lower ends.

A plastic or rubber bi-direction slit-type valve 72 is positioned in each of the lower ends of the protrusions 70. The valves 72 are normally closed but will open downwardly to permit venting air to pass downwardly therethrough to vent the container. The valves 72 will also open upwardly to permit gas in the container to pass upwardly therethrough. Each of the bi-directional valves 72 are designed so that it takes greater cracking pressure to off-gas the chemical in container 12 than the amount of pressure to let venting air into the container.

The over-molded portion 52 of the insert 10 includes an upstanding cylindrical member 74 which extends upwardly from wall 68 so as to embrace the upper portion of tube 44 as seen in the drawings. A flexible rubber valve 76 extends over the upper end of member 74 and has an X-shaped slit 78 formed therein. The slit 78 is normally closed but will open upwardly upon suction pressure being applied to the valve 76 by the associated mixing apparatus or the like.

The numeral 80 refers to a dispensing cap assembly which includes a locking collar 81 which is threadably secured to the exterior threads 18 of container 12 whereby it is designed to draw the liquid chemical from container 12. Cap assembly 80 includes an upper end 82, a lower end 84, an internally threaded portion 86 and a cylindrical chamber 88. A dispenser cap member 90 is positioned in chamber 88 and has an open lower end 92. A dispensing tube support 94 extends upwardly from cap member 90 and has the dispensing tube 24 mounted thereon which extends to a dispenser, mixer, container, etc.

A valve body 98 is snap-fitted into the lower end of locking collar 81 and is connected to cap member 90 to maintain cap member 90 in locking collar 81. Valve body 98 includes an open lower end 100 and a valve seat 102. An umbrella valve 104 is movably positioned in valve seat 102 and is normally closed. When chemical is being drawn from the container 12, valve 104 opens to permit chemical to pass upwardly therethrough When the cap assembly 80 is disconnected from the container 12, valve 104 prevents back flow of chemical from the dispensing tube 24.

The cap assembly 80, valve body 98, and umbrella valve 104 do not form a part of this invention since the cap assembly 80 and associated structure are disclosed in my earlier patents, namely U.S. Pat. Nos. 5,988,456; 6,142,345; and 6,968,983, the disclosures of which are incorporated herein by reference thereto to complete this disclosure if necessary.

In operation, the insert 10 is inserted into the throat 14 of the container 12 with the gripping members 43 frictionally engaging the inner surface of throat 14. At that time, the bi-directional valves 72 will be closed as will valve 76. The dip tube 20 will be positioned within container 12. The dispensing cap assembly 80 will then be screwed onto the external threads 18 of throat 14 of container 12. When the cap assembly 80 is mounted on the container 12, the cylindrical member 74 will be received in the open lower end 100 of valve body 98 with the outer side of cylindrical member 74 being in sealable engagement with the valve body 98.

When the mixing machine or the like is activated, a suction pressure or force will be exerted onto valve 104 and valve 78 to open both of those valves. The chemical in the container will be sucked or drawn upwardly through tube 44, through valve 78, through valve seat 102 and upwardly from the cap assembly 80. As chemical is being drawn from the container 12, venting air will automatically be drawn downwardly through the lowered open valves 72 and into the container 12. If excessive gas pressure develops in the container 12, the gas therein will be forced upwardly through the upwardly open valves 72 to relieve the pressure in the container.

Figure 10:
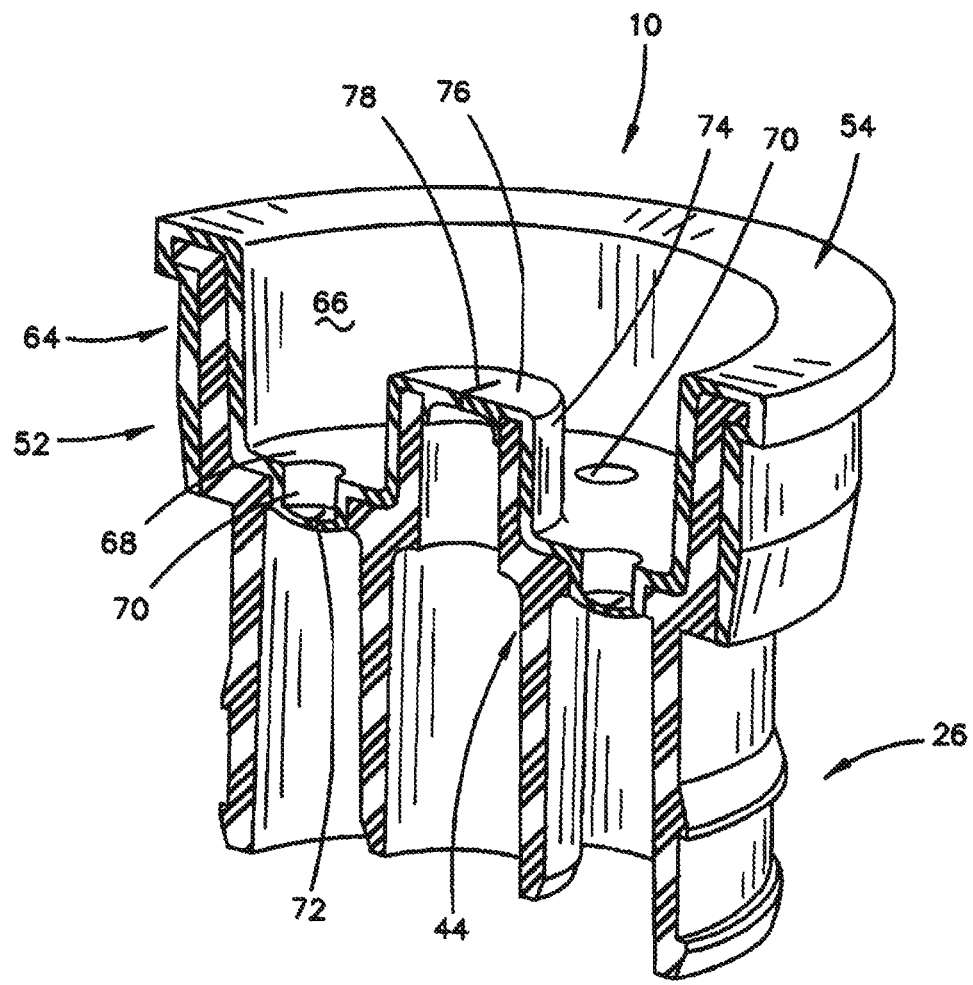
FIG. 10 is a perspective sectional view of a modified form of the container insert of this invention.
Figure 11:
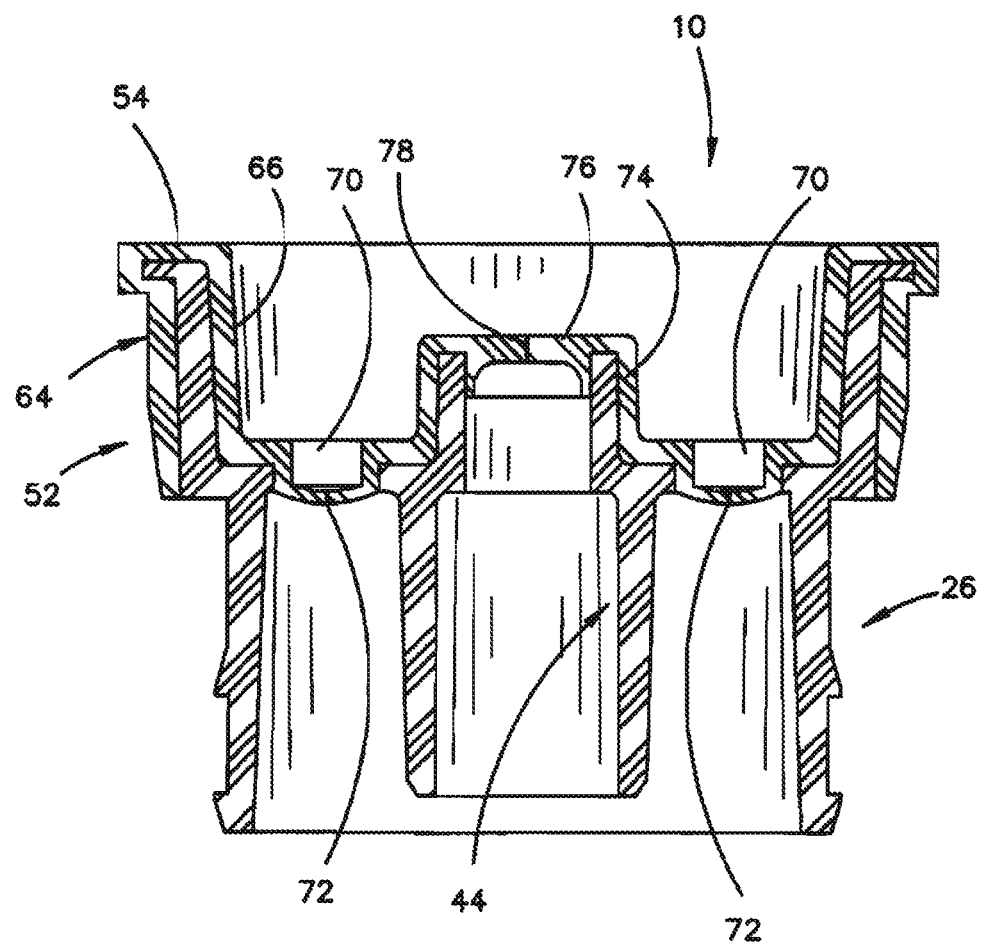
FIG. 11 is a sectional view of the modified form of the container insert of this invention.

FIGS. 10 and 11 illustrate a modified form of the insert 10. The only difference between the insert of FIGS. 1-9 and FIGS. 10 and 11 is that the cylindrical member 74 of FIGS. 10 and 11 has a shorter height than the cylindrical member 74 of FIGS. 1-9 and has a smaller diameter than the cylindrical member 74 of FIGS. 1-9, The height and diameter of cylindrical member 74 will vary upon the particular system in which it is used.

The heart of the instant invention is that the substrate portion 26 and the over-molded portion 52 of the container insert are simultaneously molded in a single molding step. The cost of producing the container insert is reduced by over-molding the outer soft sealing area along with the bi-directional valves and the center flow chemical in one piece. This reduces the amount of components that need to be assembled, while increasing the functionality of the final piece. The result is that the number of components has been reduced from 5 to 1.

The substrate portion 26 may be molded from any resin that would act as a structural support to the over-molded portion 52 such as polypropylene, polyethylene or PVDF. The over-molded resin could be any resin that has a soft enough diameter to create a seal and form a valve such as metallocene, TPV, TPU or TPE.

Thus it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

I claim:

1. A method of forming a container insert for insertion into the throat of a container of a closed loop dispensing system, comprising the steps of:
   molding a plastic substrate portion including:
   (a) a cylindrical upper wall member having an upper end, a lower end, an inner side and an outer side;
   (b) a horizontally disposed lip extending outwardly from said upper end of said upper wall member;
   (c) a horizontally disposed and disc-shaped wall extending inwardly from said lower end of said upper wall member;
   (d) a cylindrical lower wall member, having an upper end and a lower end, extending downwardly from said lower end of said cylindrical wall member;
   (e) a vertically disposed hollow tube molded with said horizontally disposed and disc-shaped wall at the center thereof and which has an open upper end, and an open lower end, an outer surface and an inner surface;
   (f) said open lower end of said hollow tube being positioned below said horizontally disposed and disc-shaped wall;
   (g) said open upper end of said hollow tube being positioned above said horizontally disposed and disc-shaped wall;
   (h) said horizontally disposed and disc-shaped wall having a plurality of radially spaced-apart openings, having upper and lower ends, formed therein outwardly of said hollow tube;
   simultaneously overmolding said substrate portion at the time that said substrate portion is molded whereby said overmolding embraces:
   (a) said outer side of said cylindrical upper wall member;
   (b) said horizontally disposed lip;
   (c) said inner side of said cylindrical upper wall member;
   (d) said horizontally disposed and disc-shaped wall;

(e) said lower ends of said radially spaced-apart openings;
(f) said outer surface of said vertically disposed hollow tube;
(g) said upper end of said vertically disposed hollow tube;

said overmolding at said upper end of said hollow tube having a slit valve formed therein; and said overmolding at said lower ends of said radially spaced-apart opening having a slit valve formed therein.

2. The method of claim 1 wherein the plastic substrate portion of the container is comprised of polyethylene.

3. The method of claim 1 wherein the plastic substrate portion of the container insert is comprised of polypropylene.

4. The method of claim 1 wherein the plastic substrate portion of the container insert is comprised of PVDF.

5. The method of claim 1 wherein the over-molded portion of the container insert is comprised of metallocene.

6. The method of claim 1 wherein the over-molded portion of the container insert is comprised of TPV.

7. The method of claim 1 wherein the over-molded portion of the container insert is comprised of TPU.

8. The method of claim 1 wherein the over-molded portion of the container insert is comprised of TPE.

* * * * *